US012699601B2

(12) United States Patent
Saxena et al.

(10) Patent No.: US 12,699,601 B2
(45) Date of Patent: Aug. 4, 2026

(54) OPTIMAL POD MANAGEMENT TO MEET DEFINED TARGET OBJECTIVES

(71) Applicant: International Business Machines Corporation, Armonk, NY (US)

(72) Inventors: Rajesh Kumar Saxena, Thane West (IN); Tanmay Arvind Ambre, Pune (IN); Nampreet Pal Singh, Pune (IN); Amit Deshpande, Pune (IN); Harish Bharti, Pune (IN)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 18/454,985

(22) Filed: Aug. 24, 2023

(65) Prior Publication Data

US 2025/0068487 A1     Feb. 27, 2025

(51) Int. Cl.
| | |
|---|---|
| *G06F 9/50* | (2006.01) |
| *G06F 8/60* | (2018.01) |
| *G06F 9/455* | (2018.01) |
| *G06F 11/30* | (2006.01) |
| *G06F 11/34* | (2006.01) |
| G06F 8/61 | (2018.01) |

(52) U.S. Cl.
CPC .............. *G06F 9/5094* (2013.01); *G06F 8/60* (2013.01); *G06F 11/301* (2013.01); *G06F 11/3409* (2013.01); *G06F 11/3442* (2013.01); *G06F 8/63* (2013.01); *G06F 9/45558* (2013.01); *G06F 2009/45562* (2013.01); *G06F 2009/4557* (2013.01); *G06F 2009/45575* (2013.01); *G06F 2201/81* (2013.01); *G06F 2201/815* (2013.01)

(58) Field of Classification Search
None
See application file for complete search history.

(56) References Cited

U.S. PATENT DOCUMENTS

| | | |
|---|---|---|
| 8,712,950 B2 | 4/2014 | Smith et al. |
| 11,102,281 B2 * | 8/2021 | Chatt .................. H04L 67/1008 |
| 11,507,430 B2 | 11/2022 | Subramanian et al. |

(Continued)

FOREIGN PATENT DOCUMENTS

| CN | 110825580 A | 2/2020 |
|---|---|---|

OTHER PUBLICATIONS

Anonymous, "A New System and Apparatus for Optimum Performance Oriented Container Orchestration," An IP.com Prior Art Database Technical Disclosure, IPCOM000263884D, Oct. 16, 2020, 6 pages.

*Primary Examiner* — Abu Zar Ghaffari
(74) *Attorney, Agent, or Firm* — Yee & Associates, P.C.

(57)     ABSTRACT

Optimal pod management is provided. A pod-warm component located on a host node is directed to trigger generation of a pod snapshot image of a pod in an optimal state running on the host node in response to determining that the pod has attained the optimal state. An input is received to instantiate a second instance of the pod on the host node in response to detecting that one or more of a plurality of pod performance metrics have exceeded a corresponding maximum pod performance metric threshold level. The pod-warm component located on the host node is directed to instantiate the second instance of the pod fully warm in the optimal state on the host node using the pod snapshot image of the pod to decrease startup time of the pod and increase performance of the host node.

16 Claims, 8 Drawing Sheets

(56)          References Cited

U.S. PATENT DOCUMENTS

| 11,550,672 | B1  |         | 1/2023  | Kurian et al. |              |
|------------|-----|---------|---------|---------------|--------------|
| 2019/0102226 | A1* | 4/2019  | Caldato | ................. | G06F 11/362 |
| 2021/0303522 | A1* | 9/2021  | Periyagaram | ........... | G06F 16/13 |
| 2022/0327382 | A1* | 10/2022 | Sexton | ................... | G06N 3/045 |
| 2022/0334886 | A1* | 10/2022 | Vishwanath | ........ | G06F 11/3433 |
| 2023/0004436 | A1* | 1/2023  | Bai | ...................... | G06F 1/3228 |
| 2023/0109690 | A1* | 4/2023  | Mutha | ................... | G06F 9/5083 |
|            |     |         |         |               | 718/1        |
| 2023/0121475 | A1  | 4/2023  | Kowalczyk et al. |      |            |
| 2023/0195497 | A1* | 6/2023  | Ota | ........................... | G06F 8/60 |
|            |     |         |         |               | 718/1        |
| 2024/0103918 | A1* | 3/2024  | Panikkar | ............. | G06F 9/45558 |
| 2024/0160465 | A1* | 5/2024  | An | ...................... | G06F 9/45558 |
| 2025/0080426 | A1* | 3/2025  | Tripathi | ............. | G06F 11/3006 |

\* cited by examiner

COMPUTING ENVIRONMENT
100

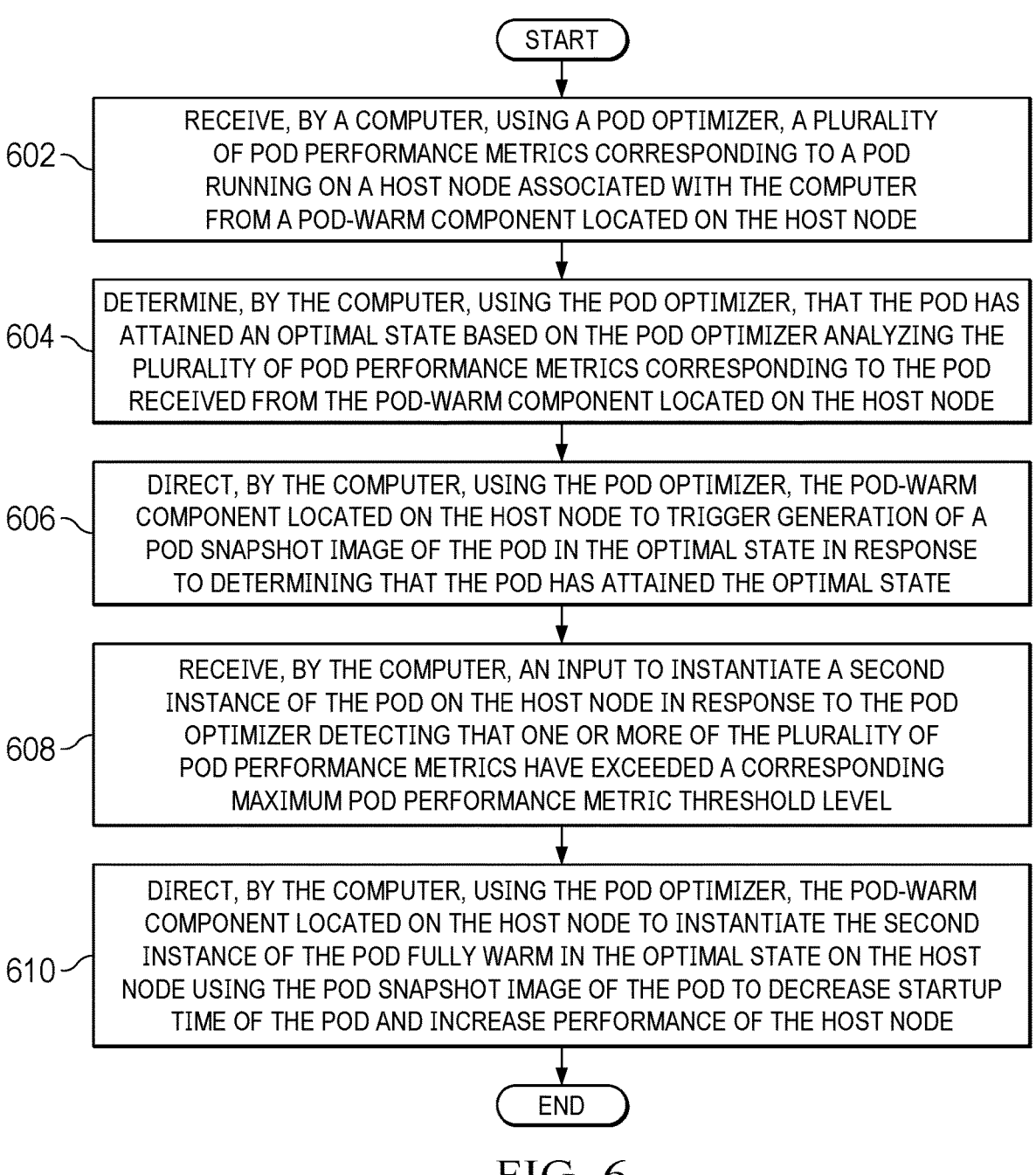

START

602 — RECEIVE, BY A COMPUTER, USING A POD OPTIMIZER, A PLURALITY OF POD PERFORMANCE METRICS CORRESPONDING TO A POD RUNNING ON A HOST NODE ASSOCIATED WITH THE COMPUTER FROM A POD-WARM COMPONENT LOCATED ON THE HOST NODE

604 — DETERMINE, BY THE COMPUTER, USING THE POD OPTIMIZER, THAT THE POD HAS ATTAINED AN OPTIMAL STATE BASED ON THE POD OPTIMIZER ANALYZING THE PLURALITY OF POD PERFORMANCE METRICS CORRESPONDING TO THE POD RECEIVED FROM THE POD-WARM COMPONENT LOCATED ON THE HOST NODE

606 — DIRECT, BY THE COMPUTER, USING THE POD OPTIMIZER, THE POD-WARM COMPONENT LOCATED ON THE HOST NODE TO TRIGGER GENERATION OF A POD SNAPSHOT IMAGE OF THE POD IN THE OPTIMAL STATE IN RESPONSE TO DETERMINING THAT THE POD HAS ATTAINED THE OPTIMAL STATE

608 — RECEIVE, BY THE COMPUTER, AN INPUT TO INSTANTIATE A SECOND INSTANCE OF THE POD ON THE HOST NODE IN RESPONSE TO THE POD OPTIMIZER DETECTING THAT ONE OR MORE OF THE PLURALITY OF POD PERFORMANCE METRICS HAVE EXCEEDED A CORRESPONDING MAXIMUM POD PERFORMANCE METRIC THRESHOLD LEVEL

610 — DIRECT, BY THE COMPUTER, USING THE POD OPTIMIZER, THE POD-WARM COMPONENT LOCATED ON THE HOST NODE TO INSTANTIATE THE SECOND INSTANCE OF THE POD FULLY WARM IN THE OPTIMAL STATE ON THE HOST NODE USING THE POD SNAPSHOT IMAGE OF THE POD TO DECREASE STARTUP TIME OF THE POD AND INCREASE PERFORMANCE OF THE HOST NODE

END

START

702 — RECEIVE, BY A COMPUTER, USING A POD OPTIMIZER, A PLURALITY OF POD PERFORMANCE METRICS CORRESPONDING TO OPERATION OF A MICROSERVICE PROVIDED BY A CONTAINERIZED APPLICATION RUNNING IN A POD OF A HOST NODE FROM A POD-WARM COMPONENT LOCATED ON THE HOST NODE

704 — PERFORM, BY THE COMPUTER, USING THE POD OPTIMIZER, AN ANALYSIS OF THE POD PERFORMANCE METRICS CORRESPONDING TO THE OPERATION OF THE MICROSERVICE PROVIDED BY THE CONTAINERIZED APPLICATION RUNNING IN THE POD OF THE HOST NODE RECEIVED FROM THE POD-WARM COMPONENT

706 — GENERATE, BY THE COMPUTER, USING THE POD OPTIMIZER, A PLURALITY OF POD INSTANTIATION CURVES CORRESPONDING TO THE POD OF THE HOST NODE ON A POD OPTIMIZATION GRAPH BASED ON THE ANALYSIS OF THE POD PERFORMANCE METRICS THAT CORRESPOND TO THE OPERATION OF THE MICROSERVICE PROVIDED BY THE CONTAINERIZED APPLICATION RUNNING IN THE POD

708 — COMBINE, BY THE COMPUTER, USING THE POD OPTIMIZER, CERTAIN POD INSTANTIATION CURVES OF THE PLURALITY OF POD INSTANTIATION CURVES TO FORM A SET OF PROMINENT POD INSTANTIATION CURVES BASED ON PREDICTED SERVICE REQUEST LOAD AND DEFINED TARGET OBJECTIVES CORRESPONDING TO THE POD

710 — GENERATE, BY THE COMPUTER, USING THE POD OPTIMIZER, A PLURALITY OF PERFORMANCE CURVES CORRESPONDING TO THE POD BASED ON THE SET OF PROMINENT POD INSTANTIATION CURVES

712 — GENERATE, BY THE COMPUTER, USING THE POD OPTIMIZER, A LOOK AHEAD PROJECTION OF TIME POINTS ON THE POD OPTIMIZATION GRAPH THAT INTERSECT WITH EACH PERFORMANCE CURVE OF THE PLURALITY OF PERFORMANCE CURVES CORRESPONDING TO THE POD AT DIFFERENT POINTS IN TIME, EACH OF THE TIME POINTS THAT INTERSECTS WITH EACH OF THE PLURALITY OF PERFORMANCE CURVES CORRESPONDING TO THE POD AT THE DIFFERENT POINTS IN TIME FORM A PLURALITY OF POD PERFORMANCE INTERSECTIONS CORRESPONDING TO THE PLURALITY OF PERFORMANCE CURVES ON THE POD OPTIMIZATION GRAPH

FROM FIG. 7A

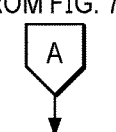

A

714 — SELECT, BY THE COMPUTER, USING THE POD OPTIMIZER, A SET OF POD PERFORMANCE INTERSECTIONS FROM THE PLURALITY OF POD PERFORMANCE INTERSECTIONS CORRESPONDING TO THE PLURALITY OF PERFORMANCE CURVES FOR THE POD THAT CORRESPONDS TO A SHAPE APPROXIMATE REPRESENTING A GLOBAL ACTIVATION GRADIENT FOR THE POD

716 — DETERMINE, BY THE COMPUTER, USING THE POD OPTIMIZER, AN ENERGY LEVEL OF EACH POD PERFORMANCE INTERSECTION OF THE SET OF POD PERFORMANCE INTERSECTIONS CORRESPONDING TO THE PLURALITY OF PERFORMANCE CURVES FOR THE POD THAT CORRESPONDS TO THE SHAPE APPROXIMATE REPRESENTING THE GLOBAL ACTIVATION GRADIENT FOR THE POD BASED ON KALMAN FILTERING

718 — GENERATE, BY THE COMPUTER, USING THE POD OPTIMIZER, A LOOK AHEAD CURVE THAT TRACES A PATH OF MAXIMUM ENERGY WITH MINIMUM NOISE CLOSEST TO ALL OF THE THE PLURALITY OF PERFORMANCE CURVES FOR THE POD BASED ON THE ENERGY LEVEL DETERMINED FOR EACH POD PERFORMANCE INTERSECTION OF THE SET OF POD PERFORMANCE INTERSECTIONS CORRESPONDING TO THE PLURALITY OF PERFORMANCE CURVES

720 — PERFORM, BY THE COMPUTER, USING THE POD OPTIMIZER, RECURSIVE CURVE FITTING OF THE LOOK AHEAD CURVE OVER A TIME PERIOD TO DECREASE CURVE FITMENT ERROR TO IDENTIFY A BEST PATH OF MAXIMUM ENERGY WITH MINIMUM NOISE CLOSEST TO ALL OF THE THE PLURALITY OF PERFORMANCE CURVES FOR THE POD

722 — DETERMINE, BY THE COMPUTER, USING THE POD OPTIMIZER, AN OPTIMAL STATE OF THE POD BASED ON THE BEST PATH OF MAXIMUM ENERGY WITH MINIMUM NOISE CLOSEST TO ALL OF THE PLURALITY OF PERFORMANCE CURVES FOR THE POD

724 — DIRECT, BY THE COMPUTER, USING THE POD OPTIMIZER, THE POD-WARM COMPONENT LOCATED ON THE HOST NODE TO TAKE A SNAPSHOT IMAGE OF THE POD IN THE OPTIMAL STATE FOR FUTURE INSTANTIATIONS OF THE POD ON THE HOST NODE IN RESPONSE TO THE POD OPTIMIZER DETERMINING THAT THE POD ATTAINED THE OPTIMAL STATE

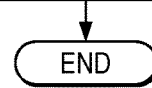

END

FIG. 7B

OPTIMAL POD MANAGEMENT TO MEET DEFINED TARGET OBJECTIVES

BACKGROUND

The disclosure relates generally to container orchestration architectures and more specifically to optimal pod management to meet defined target objectives for a microservice running in a container orchestration architecture.

A container orchestration architecture, such as, for example, Kubernetes® (a registered trademark of the Linux Foundation of San Francisco, California, USA), is used to deploy and manage containerized applications across host nodes on a cloud environment or within on-premises servers. A host node is a machine, either physical or virtual, where containers (i.e., application workload) are deployed.

The smallest deployable unit that a container orchestration architecture can create and manage is a pod. A pod encapsulates the containerized application. Typically, a single container is configured in a pod, but there are times when configuring multiple containers in a single pod is needed. This usually occurs when there are two or more containers tightly coupled to each other. For example, there can be a primary application container and one or more secondary application containers (e.g., sidecar or proxy containers) that can exist in the same pod. The primary application container contains the application code or main business logic, while the secondary application containers serve as helper containers that provide complementary functionality to support the services provided by the primary application container.

SUMMARY

According to one illustrative embodiment, a computer-implemented method for optimal pod management is provided. A computer directs a pod-warm component located on a host node to trigger generation of a pod snapshot image of a pod in an optimal state running on the host node in response to determining that the pod has attained the optimal state. The computer receives an input to instantiate a second instance of the pod on the host node in response to detecting that one or more of a plurality of pod performance metrics have exceeded a corresponding maximum pod performance metric threshold level. The computer directs the pod-warm component located on the host node to instantiate the second instance of the pod fully warm in the optimal state on the host node using the pod snapshot image of the pod to decrease startup time of the pod and increase performance of the host node. According to other illustrative embodiments, a computer system and computer program product for optimal pod management are provided.

BRIEF DESCRIPTION OF THE DRAWINGS

FIG. 6 is a flowchart illustrating a process for instantiating a pod fully warm in an optimal state on a host node in accordance with an illustrative embodiment; and FIGS. 7A-7B are a flowchart illustrating a process for determining an optimal state of a pod in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
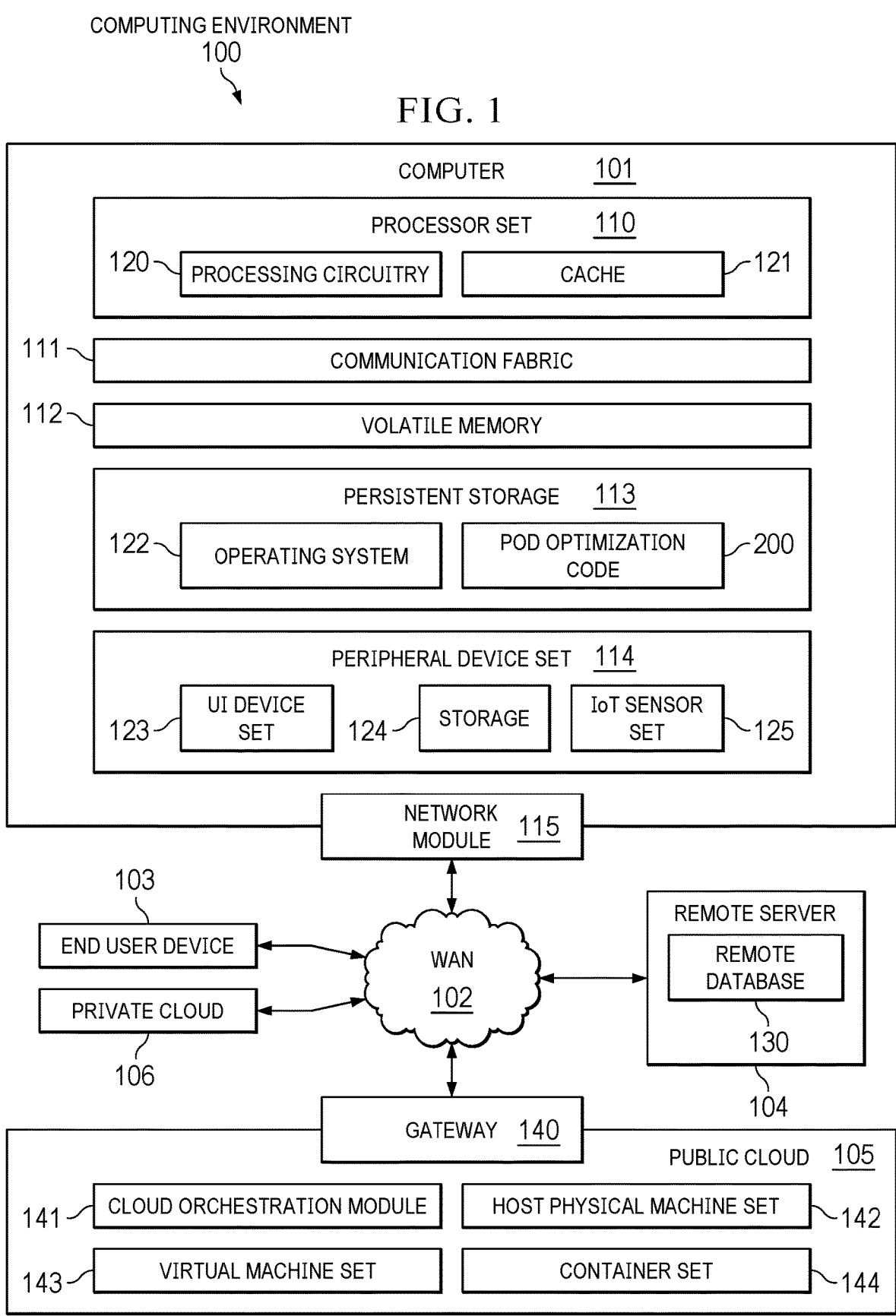
FIG. 1 is a pictorial representation of a computing environment in which illustrative embodiments may be implemented.
Figure 2:
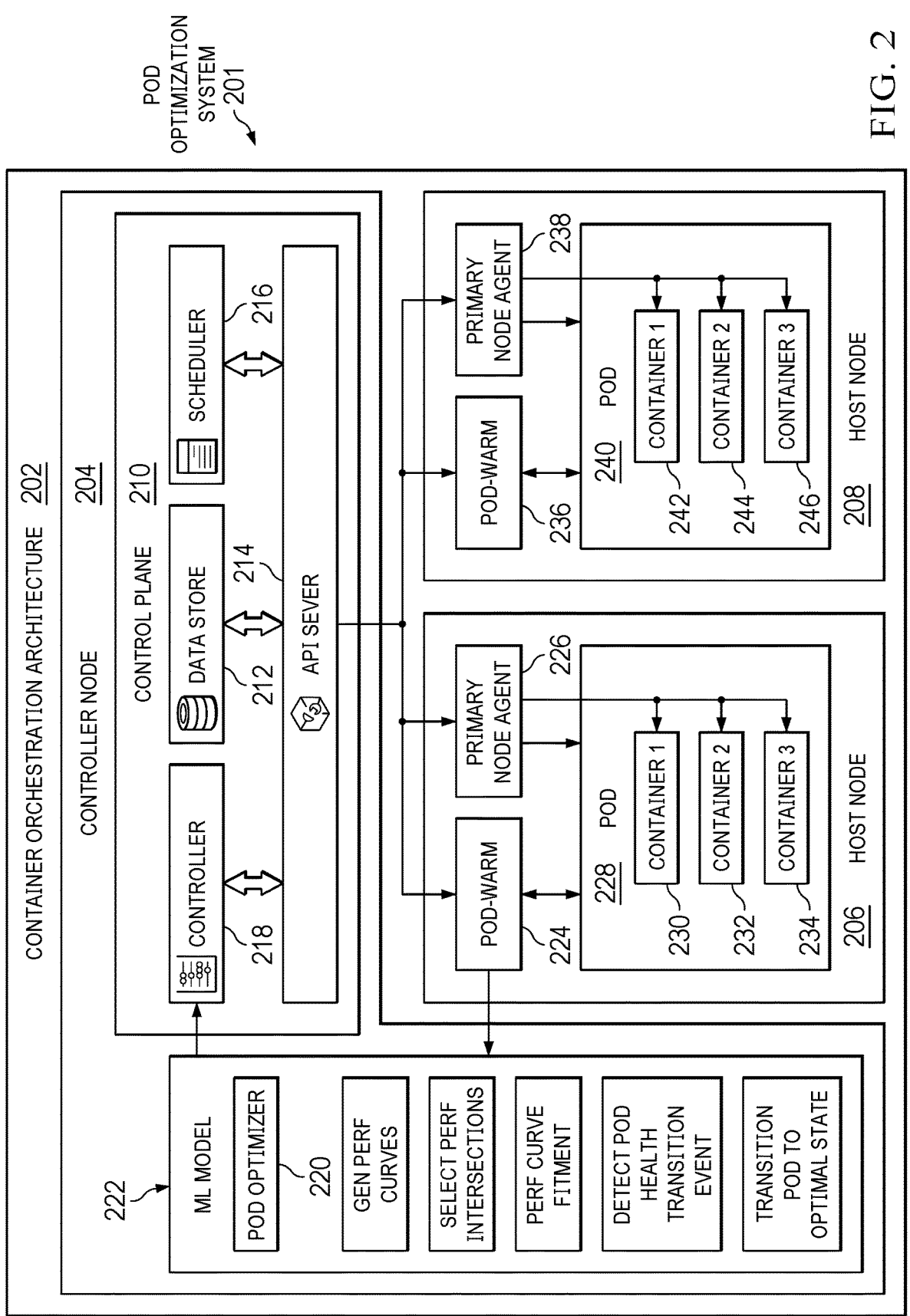
FIG. 2 is a diagram illustrating an example of a pod optimization system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of a container orchestration environment for the execution of at least some of the computer code involved in performing the inventive methods of illustrative embodiments, such as pod optimization code 200. For example, pod optimization code 200 generates a look ahead curve which traces a path of maximum energy and minimum noise closest to all of a plurality of performance curves for a pod running a microservice of a containerized application on a host node in the container orchestration environment based on a determined energy level of each respective pod performance intersection corresponding to the plurality of performance curves. Then, pod optimization code 200 recursively generates the look ahead curve over a time period to identify the best path of maximum energy to transition the pod to an optimal state of health for the microservice to meet defined target objectives, such as, for example, service level agreements, service level objectives, key performance indicators, and the like.

In addition to pod optimization code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and pod optimization code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in pod optimization code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a customer of an entity that operates computer 101), and may take any of the forms discussed above in connection with computer 101. EUD 103 typically receives helpful and useful data from the operations of computer 101. For example, in a hypothetical case where computer 101 is designed to provide a recommendation to the end user, this recommendation would typically be communicated from network module 115 of computer 101 through WAN 102 to EUD 103. In this way, EUD 103 can display, or otherwise present, the recommendation to the end user. In some embodiments, EUD 103 may be a client device, such as thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A. item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

A container orchestration architecture, platform, system, environment, or the like (e.g., Kubernetes) provides support for automating containerized application deployment, scaling, and management. Typically, the container orchestration architecture deploys a containerized application in logical unit called a pod. A pod can have one or more containers running inside it. To implement auto-scaling, the container orchestration architecture can start multiple pods of the same deployment on a host node based on various parameters, such as, for example, number of service requests received, amount of processor utilization, amount of memory utilization, amount of storage utilization, amount of network utilization, and the like. However, the startup time of the pod is dependent on the startup time of the containerized application running inside the pod which in turn depends upon the technologies used to build the containerized application, the objects the containerized application generates at startup time, and the network connections the containerized application makes to outside resources, such as, for example, a database, queuing system, and the like, at startup time.

Currently, no solution exists that can bring a pod to its optimal state quickly (i.e., fully warm and ready to run) at startup time, independent of the startup time of the containerized application inside the pod. For example, even though current container orchestration architectures can provide a way to bring pods up or down automatically (i.e., perform auto-scaling) based on certain parameters, these current container orchestration architectures cannot decrease the startup time of a pod by removing dependency from the technology used to build the containerized application to be run inside the pod, the objects the containerized application generates at startup time, and the network connections the containerized application makes to outside resources at startup time.

In contrast, illustrative embodiments provide a container orchestration architecture capable of dynamic pod management for optimal pod performance at pod startup time (i.e., reducing the startup time of the pod by instantiating the pod in a fully warm state using a pod snapshot image of the pod captured at its optimal state to achieve defined target objectives for the microservice provided by the containerized application and removing dependency on the startup time of the containerized application). For example, illustrative embodiments add a new component, pod-warm, to each host node in the container orchestration architecture. Pod-warm communicates with the application programming interface (API) server and pod optimizer of the controller node in the container orchestration architecture to send a plurality of pod performance metrics corresponding to that particular host node. The API server communicates with the primary node agent in the host node to perform needed actions (e.g., execute container lifecycles in the pod). The pod optimizer is a machine learning model, such as, for example, a recursive neural network, that determines a set of recommended actions to instantiate the pod fully warm in an optimal state based on the plurality of pod performance metrics received from pod-warm. Pod-warm can be driven by configuration or, in an alternative illustrative embodiment, can be built as a component with artificial intelligence (e.g., a machine learning model similar to the pod optimizer) to determine the next set of recommended actions to instantiate the pod fully warm in an optimal state.

Pod-warm collects the performance metrics corresponding to the pod running the microservice of the containerized application on that particular host node. The pod performance metrics include, for example, information corresponding to the pod running in the host node, information regarding each respective container running in the pod, information regarding the amount of time needed for the pod to be fully warm (e.g., time needed to load libraries in containers) and ready to run, information regarding the average warm time of the containerized application running in the pod, information regarding amount of resource utilization by the pod (e.g., amount of processors, memory, storage, network, and the like utilized by containers in the pod), information regarding cost to hibernate or preserve an image of the pod in its optimal state, information regarding probability of sudden increase in service requests to the pod, and information regarding defined target objectives (e.g., service level agreement, service level objective, key performance indicators, and the like) corresponding to the microservice provided by the containerized application running in the pod. Pod-warm sends the collected pod performance metrics to the API server and pod optimizer located in the controller node for analysis.

In response to the pod optimizer determining that the pod has reached an optimal state based on analyzing the pod performance metrics received from pod-warm, the pod optimizer instructs pod-warm to trigger generation of a snapshot image of the pod in its optimal state using a pod snapshot generator. Therefore, after the pod snapshot generator generates the snapshot image of the pod in its optimal state, when the controller node receives an input to generate another instance of that same pod in the host node, the controller node directs pod-warm to generate the other instance of the pod in the host node utilizing the snapshot image of that particular pod in its optimal state. As a result, by pod-warm utilizing the snapshot to generate the other instance of the pod, pod-warm reduces the startup time of the pod in the host node independent of the startup time of the containerized application corresponding to the microservice that will run in that pod increasing performance of the host node.

Thus, illustrative embodiments utilize pod-warm to input the pod performance metrics, along with the defined target objectives, into the pod optimizer (e.g., a machine learning model, such as a recursive neural network) for automatic implementation of recommended strategies to transition the pod to an optimal state in response to a detected pod health transition event. The detected pod health transition event may be, for example, the number of service requests for the microservice provided by the containerized application running on the pod exceeding a maximum number of service requests threshold level for the microservice running on that pod.

Illustrative embodiments, utilizing the pod optimizer, generate a plurality of pod instantiation curves corresponding to the pod of the host node on a pod optimization graph where the x-axis represents time and the y-axis represents pod activation based on received pod performance metrics, which correspond to the operations of the microservice running in the pod, from pod-warm. Illustrative embodiments, utilizing the pod optimizer, combine certain pod instantiation curves of the plurality of pod instantiation curves to form a set of prominent pod instantiation curves, which correspond to the pod, based on predicted service request load and the defined target objectives corresponding to the pod as a gradient.

Afterward, illustrative embodiments, utilizing the pod optimizer, generate a plurality of performance curves (possibly belonging to a family of performance curves) for the pod based on the set of prominent pod instantiation curves. Further, illustrative embodiments, utilizing the pod optimizer, generate a look ahead projection of time points on the x-axis of the graph that intersect with each performance curve of the plurality of performance curves for the pod at different points in time. Each of the time points that intersects with each of the plurality of performance curves for the pod at the different points in time form a plurality of pod performance intersections corresponding to the plurality of performance curves for the pod along the x-axis of the graph.

Illustrative embodiments, utilizing the pod optimizer, select a set of pod performance intersections from the plurality of pod performance intersections corresponding to the plurality of performance curves for the pod along the x-axis of the graph that corresponds to a shape approximate representing a global activation gradient for the pod. The pod optimizer utilizes the global activation gradient to determine whether the pod is moving toward an optimal state or not. Illustrative embodiments, utilizing the pod optimizer, determine an energy level of each pod performance intersection of the set of pod performance intersections corresponding to the plurality of performance curves for the pod along the x-axis of the graph that corresponds to the shape approximate representing the global activation gradient for the pod based on Kalman filtering. Each positive energy level of the set of pod performance intersections indicates recommended actions to bring the pod to an optimal state.

Illustrative embodiments, utilizing the pod optimizer, generate a look ahead curve that traces a path of maximum energy with minimum noise closest to all of the plurality of performance curves for the pod based on the determined energy level for each pod performance intersection of the set of pod performance intersections corresponding to the plurality of performance curves. Illustrative embodiments, utilizing the pod optimizer, performs recursive curve fitting of the look ahead curve over time to reduce the fitment error to identify a best path of maximum energy with minimum noise closest to all of the plurality of performance curves for the pod. Illustrative embodiments, utilizing the pod optimizer, determine an optimal state for the pod based on the best path of maximum energy with minimum noise closest to all of the plurality of performance curves for the pod. Illustrative embodiments, utilizing the pod optimizer, direct pod-warm to take a snapshot image of the pod in the determined optimal state and store the snapshot image, along with recommended actions, for future instantiations of the pod on the host node in response to illustrative embodiments determining that the pod obtained the optimal state.

It should be noted that all of the pod performance metrics are non-convergent and mutually exclusive metrics with some amount of autocorrelation that is insignificant. As a result, illustrative embodiments understand that these pod performance metrics will lead to a singular decision variable that is rangebound. This transformation from a multi-covariant set to a liner convergent variable, which is the adaptive pod activation, will generate the family of pod performance curves. These pod performance curves are known behaviors for the adaptive pod activation.

Illustrative embodiments identify the best path of maximum energy for pod instantiation. For example, all of the potential pod performance curves are likely possibilities of the values that the activation gradient is likely to assume as illustrative embodiments generate look ahead projections. These likely possibilities are the pod performance intersections with each of the pod performance curves.

Illustrative embodiments utilize the pod optimizer to extract sets of pod performance intersections from the pod performance curves within specific time periods in decreasing order of their length. Illustrative embodiments then impose a global activation gradient on each extracted set of pod performance intersections so that the underlying area belongs to a specific curve. The main issues are in designing: 1) a global grouping technique that results in a high combinatorial complexity; and 2) a fitting technique (for the family of pod performance curves) that involves a large number of variations. As a result, illustrative embodiments select the pod performance intersections such that illustrative embodiments identify the best way to maximize the area under the curve of the next best probabilities. This enables illustrative embodiments to generate a global activation gradient that represents the activation level for the pod, which is managed by pod-warm, on the host node.

Below represents one possible implementation of multiple implementations that are feasible and is broadly described above. Illustrative embodiments select the set of pod performance intersections based on geometrical aspects. For example, illustrative embodiments select a set of pod performance intersections corresponding to a shape approximate "S". Illustrative embodiments define the fitting error, $e^{fit}$, of a set of pod performance intersections, $E_0 \ldots E_m$, as the sum of the Least-Squared distances between the pod performance intersections and the best fitting shape s in S as follows:

$$e^{fit}(E_0 \ldots E_m) = \min_{s \in S} \sum_{i=0}^{m} d^2(E_i, s). \qquad \text{Eq(1)}$$

A large error indicates that the set of pod performance intersections cannot be well represented by a curve in S, which means that adding another pod performance intersection to the set of pod performance intersections will increase the fitting error. Thus, illustrative embodiments utilize a measure, $e^{over}(E_0 \ldots E_m)$, based on the sum of the pod performance intersection lengths and on their density within the fitted curve as follows:

$$e^{over}(E_0 \ldots E_{m+1}) \geq e^{over}(E_0 \ldots E_m) + e^{fit}(E_{m+1}). \qquad \text{Eq(2)}$$

An energy, which indicates how consistent the pod performance intersections are with respect to the best curve in S, can be defined by the weighted differences of $e^{over}$ and $e^{fit}$ as follows:

$$G(E_0 \ldots E_m) = \lambda e^{over}(E_0 \ldots E_m) - e^{fit}(E_0 \ldots E_m), \qquad \text{Eq(3)}$$

where $\lambda$ controls the tradeoff between $e^{fit}$ and $e^{over}$.

Then, illustrative embodiments derive the "energy gain" of grouping a pod performance intersection, $E_{m+1}$, with a set of pod performance intersections, $(E_0 \ldots, E_m)$ using:

$$\gamma = G(E_0, \ldots, E_m, E_{m+1}) - G(E_0 \ldots E_m) - G(E_{m+1}), \qquad \text{Eq(4)}$$

where a positive $\gamma$ represents a likely good grouping of pod performance intersections. A set of pod performance intersections having a large energy gain "G" is then an important geometrical structure. Keeping only a set of the pod performance intersections, which have an energy gain G above a defined energy gain threshold level become valid alternatives over selecting pod performance intersections with respect to their contrast amplitudes.

The solution is the set pod performance intersections of Eq(4), which can be found using:

$$E(p) = \sum_{p \in P} \left( \lambda e^{over}(\{E_i\} \in P) - e^{fit}(\{E_i\} \in P) \right). \qquad \text{Eq(5)}$$

Nevertheless, illustrative embodiments can obtain an approximative solution of Eq(1) in reasonable time under the following assumptions: 1) connected straight line pod performance intersections can be grouped together (i.e., pod performance intersections can be defined as straight line segments); 2) the family of the shapes S is a linearly parameterizable set of pod performance curves; and 3) the set of pod performance intersections can be ordered. Therefore, illustrative embodiments can generate a directed acyclic graph of the set of pod performance intersections.

Further, illustrative embodiments perform curve augmentation. For example, linear subspaces of pod performance curves allow recursive estimates of the pod performance curve parameters when illustrative embodiments add a new pod performance intersection. Illustrative embodiments can define a pod performance intersection by two pixel positions (i.e., by two points). Illustrative embodiments consider that the dataset comprises points only. The simplest way to fit a curve to data is to minimize distance over the set of given data points. From Eq(1), illustrative embodiments obtain:

$$e_m^{fit} = \sum_{1 \le j \le m} (F(y_j)^t A_m - x_j)^2. \qquad \text{Eq(6)}$$

The minimization of the previous fitting error gives the normalization equation:

$$MM^t A_m = MX_m, \qquad \text{Eq(7)}$$

where $X_m = (x_m)_{1 \le j \le m}$ shows the X coordinate of the vector, $M = (F(y_j)_{1 \le j \le m}$ is the design matrix, and $S_m = MM^t$ is the scatter matrix. If $G_m = MX_m$, then Eq(7) can be written as:

$$S_m A_m = G_m. \qquad \text{Eq(8)}$$

Fitting this in a Kalman filtering framework, illustrative embodiments obtain:

$$\frac{1}{(S + FF^t)^n} = \frac{1}{S} - \frac{\psi}{sS} FF^t \qquad \text{Eq(9)}$$

$$\text{where } \psi = \frac{1}{(1 + F^t S^{-1} F)},$$

which defines the Kalman Covariance gradient, the matrices can be inverted, and the formulation allows illustrative embodiments a recursive deduction. As a result, illustrative embodiments generate the look ahead curve using:

$$A_{m+1} = A_m + K_{m+1} F_{m+1} (x_{m+1} - A_m^t F_{m+1}). \qquad \text{Eq(10)}$$

Then, illustrative embodiments utilize a recursive fitting machine learning model (e.g., a recursive neural network) or pod optimizer to recursively fit the look ahead curve. The recursive fitting machine learning model consists of: 1) selecting a pod performance intersection and initializing the recursive fitting by setting $K_0$ to k times the identity matrix, and $A_0$ to zero; 2) then compute the covariance matrix $K_1$ using Eq(9) and the curve parameters $A_1$ using Eq(10); and 3) given a new data point $(x_{m+1}, y_{m+1})$, the covariance matrix $K_m$ is updated using Eq(9) and the curve parameter vector $A_m$ is updated using Eq(10).

Illustrative embodiments can recursively update the fitting error, without requiring the updated curve parameters $A_{m+1}$ and the updated covariance parameters $K_{m+1}$, using:

$$e_{m+1}^{fit} = e_m^{fit} + \frac{(x_{m+1} - A_m^t F(y_{m+1}))^2}{1 + F^t(y_{m+1}) K_m F(y_{m+1})}. \qquad \text{Eq(11)}$$

Then: 1) starting from the bottom of a curve, that curve is always grown upward toward smaller y; 2) illustrative embodiments organize the pod performance intersections as nodes in a directed acyclic graph, where each pod performance intersection is linked to all other consistent pod performance intersections with smaller y coordinates; 3) for example, E1 and E2 are two pod performance intersections, E1→E2 when there is a direct link (i.e., an edge between nodes) in the directed acyclic graph from E1 to E2; 4) illustrative embodiments associate each pod performance intersection E with its coordinates and the best pod performance curves arriving at E; and 5) illustrative embodiments specify each pod performance curve by its energy, G, its parameters A, its covariance matrix K, and its length L. This enables illustrative embodiments to generate the directed acyclic graph, which maximizes the area under the pod performance intersections and, therefore, is the best way to determine the activation gradient of the pod managed by pod-warm.

Thus, illustrative embodiments provide one or more technical solutions that overcome a technical problem with an inability of current solutions to instantiate a pod fully warm in an optimal state on a host node independent of the startup time of the containerized application. As a result, these one or more technical solutions provide a technical effect and practical application in the field of container orchestration architectures.

With reference now to FIG. 2, a diagram illustrating an example of a pod optimization system is depicted in accordance with an illustrative embodiment. Pod optimization system 201 may be implemented in a computing environment, such as computing environment 100 in FIG. 1. Pod optimization system 201 is a system of hardware and software components for optimal pod management.

Pod optimization system 201 includes container orchestration architecture 202. In this example, container orchestration architecture 202 includes controller node 204, host node 206, and host node 208. However, it should be noted that container orchestration architecture 202 is intended as an example only and not as a limitation on illustrative embodiments. For example, container orchestration architecture 202 can include any number of controller nodes, host nodes, and other devices and components not shown.

Container orchestration architecture 202 provides a platform for automating instantiation of pods fully warm in an optimal state across host nodes, such as host node 206 and host node 208. Controller node 204 is a main controlling unit of host node 206 and host node 208 by, for example, managing the workload of host node 206 and host node 208, directing communication across host node 206 and host node 208, and the like. Host node 206 and host node 208 are machines, either physical or virtual, where controller node 204 deploys workloads of containerized applications.

Control plane 210 of controller node 204 consists of various components, such as data store 212, application programming interface (API) server 214, scheduler 216, and controller 218. Data store 212 contains configuration data for the host nodes (i.e., host node 206 and host node 208), which represents the overall and desired state of the host nodes at any given time. API server 214 provides internal and external interfaces for controller node 204. API server 214 processes and validates resource availability requests and updates state of API objects in data store 212, thereby allowing users (e.g., tenants, clients, customers, or the like) to configure application workloads across the host nodes. Scheduler 216 selects which host node (e.g., host node 206 or host node 208) an unscheduled pod runs on based on resource availability of each respective host node. A pod, such as pod 228 or pod 240, is the basic unit managed by scheduler 216. Scheduler 216 tracks resource utilization on each respective host node to ensure that workload is not scheduled in excess of available resources. Controller 218 has a reconciliation loop that drives actual host node state toward the desired host node state, communicating with API server 214 to create, update, and delete the resources controller 218 manages (e.g., pods, service endpoints, and like). If a host node's actual state does not match the desired state, then controller 218 takes action to fix the problem.

Further, controller node 204 includes pod optimizer 220. In this example, pod optimizer 220 is a component of machine learning (ML) model 222. Machine learning model 222 may be, for example, a recursive neural network or the like. Machine learning model 222 may be implemented in, for example, pod optimization code 200 in FIG. 1.

In this example, host node 206 includes pod-warm 224, primary node agent 226, and pod 228. Pod 228 includes container 1 230, container 2 232, and container 3 234. Pod-warm 224 collects a plurality of pod performance metrics corresponding to a set of microservices provided by a containerized application running on container 1 230, container 2 232, and container 3 234 in pod 228. Pod-warm 224 sends the collected pod performance metrics to pod optimizer 220 for analysis. Based on the analysis of the pod performance metrics received from pod-warm 224, pod optimizer 220, for example, generates pod performance curves, selects pod performance intersections corresponding to the pod performance curves, performs curve fitment, detects pod 228 health transition events, transitions pod 228 to an optimal state, and the like.

Primary node agent 226 is a node agent that runs on host node 206. Primary node agent 226 registers host node 206 with API server 214 of control plane 210 on controller node 204. Primary node agent 226 utilizes a pod specification provided by API server 214 to determine whether container 1 230, container 2 232, and container 3 234 described in the pod specification are running and healthy in in pod 228.

It should be noted that host node 208 is similar to host node 206 with regard to similar components and functions. For example, host node 208 includes pod-warm 236, primary node agent 238, and pod 240, which includes container 1 243, container 2 244, and container 3 246. Pod-warm 236 collects pod performance metrics corresponding to a set of microservices provided by a containerized application running on container 1 243, container 2 244, and container 3 246 in pod 240. Similarly, pod-warm 236 sends the pod performance metrics to pod optimizer 220 for analysis and optimal management of pod 240.

Figure 3:
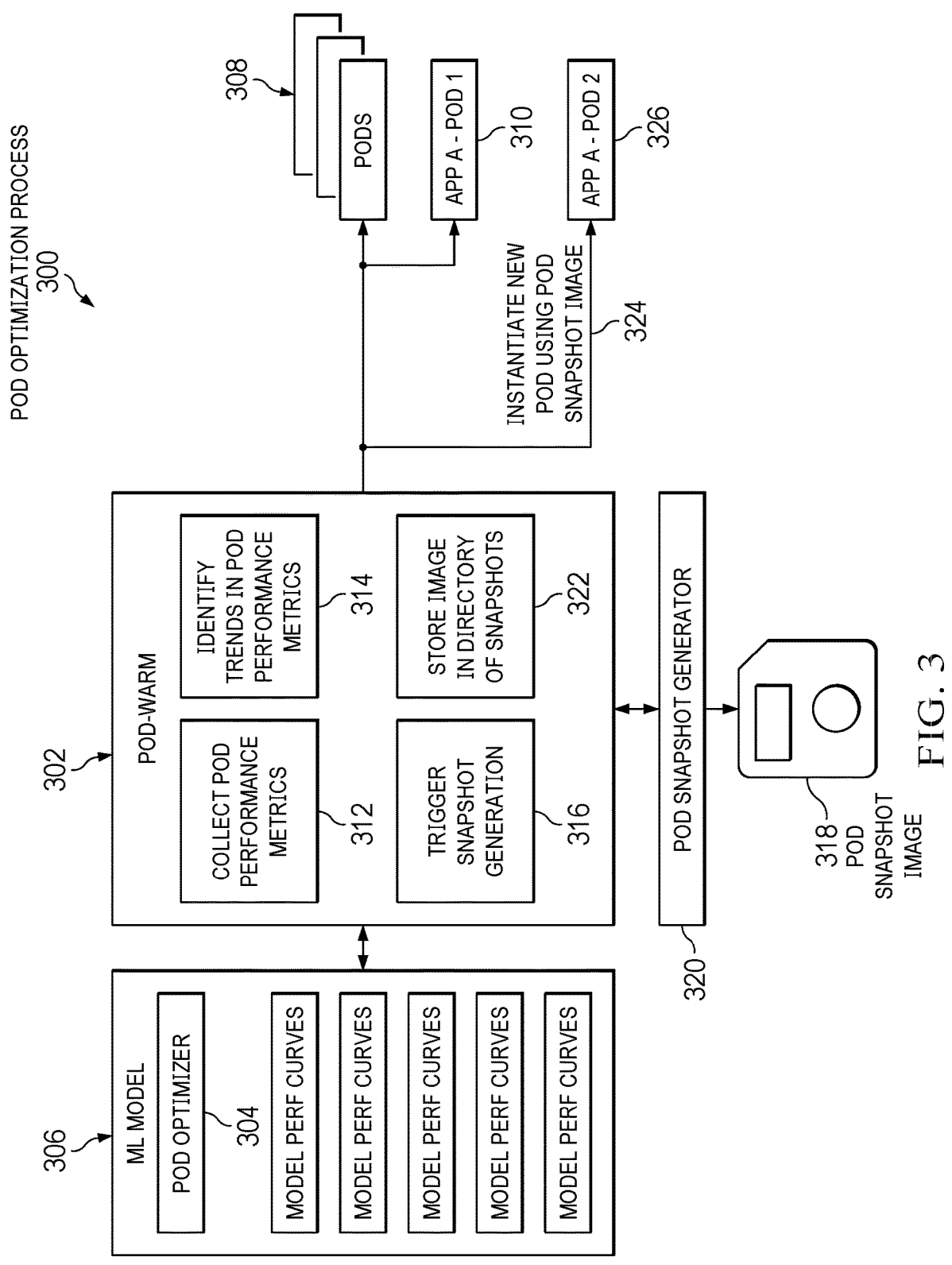
FIG. 3 is a diagram illustrating an example of a pod optimization process in accordance with an illustrative embodiment.

With reference now to FIG. 3, a diagram illustrating an example of a pod optimization process is depicted in accordance with an illustrative embodiment. Pod optimization process 300 can be implemented in a container orchestration architecture, such as, for example, container orchestration architecture 202 in FIG. 2.

In this example, pod optimization process 300 includes pod-warm 302 and pod optimizer 304. Pod-warm 302 and pod optimizer 304 may be, for example, pod-warm 224 and pod optimizer 220 in FIG. 2. Pod optimizer 304 is a component of ML model 306, such as, for example, ML model 222 in FIG. 2. Pod optimizer 304 is located in a controller node, such as, for example, controller node 204 in FIG. 2. Pod-warm 302, along with pods 308, which includes pod 1 310 corresponding to containerized application A, is located in a host node, such as, for example, host node 206 in FIG. 2.

In this example, at 312, pod-warm 302 collects pod performance metrics corresponding to the operation of a microservice provided by containerized application A running in pod 1 310. Pod-warm 302, on a defined time interval basis, on a continuous basis, or on demand, sends the collected pod performance metrics to pod optimizer 304 for analysis. At 314, based on the analysis, pod optimizer 304 identifies trends in the pod performance metrics corresponding to the operation of the microservice performed by containerized application A running in pod 1 310 to identify when pod 1 310 has attained an optimal state. At 316, based on identifying that pod 1 310 has attained an optimal state based on defined target objectives and optimal performance thresholds, pod optimizer 304 directs pod-warm 302 to trigger generation of pod snapshot image 318 of pod 1 310 in its optimal state utilizing pod snapshot generator 320. At 322, in response to pod snapshot generator 320 capturing pod snapshot image 313 of pod 1 310, pod-warm 302 stores pod snapshot image 318 in a directory or repository of snapshots.

Subsequently, the controller node receives an input to generate a new pod to run containerized application A in the host node. As a result, at 324, the controller node, utilizing pod optimizer 304, directs pod-warm 302 to retrieve pod snapshot image 318, which corresponds to the operation of the microservice provided by containerized application A running in pod 1 310, from the snapshot directory and instantiate the new pod (i.e., pod 2 326, which is a second instance of pod 1 310) in a fully warm state ready to run in the host node using pod snapshot image 318 to meet the defined target objectives of the microservice and increase performance of the host node.

Figure 4:
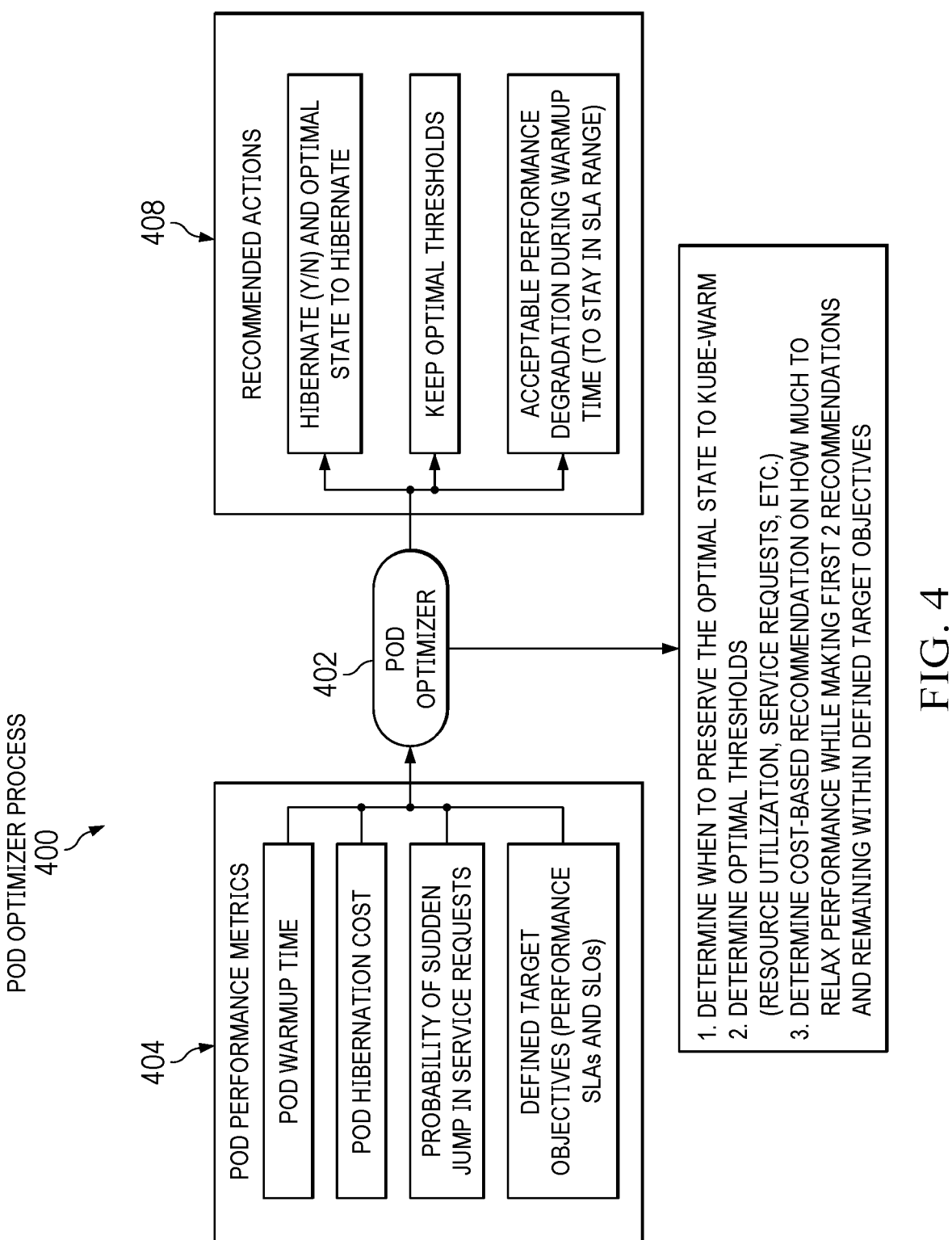
FIG. 4 is a diagram illustrating an example of a pod optimizer process in accordance with an illustrative embodiment.

With reference now to FIG. 4, a diagram illustrating an example of a pod optimizer process is depicted in accordance with an illustrative embodiment. Pod optimizer process 400 is implemented in pod optimizer 402. Pod optimizer 402 may be, for example, pod optimizer 220 in FIG. 2 or pod optimizer 304 in FIG. 3, which is located in a controller node, such as, for example, controller node 204 in FIG. 2.

Pod optimizer 402 receives as input pod performance metrics 404. Pod optimizer 402 receives pod performance metrics 404 from a pod-warm component, such as, for example, pod-warm 224 in FIG. 2 or pod-warm 302 in FIG. 2, which is located on a host node, such as, for example, host node 206 in FIG. 2. Pod performance metrics 404 correspond to a pod, such as, for example, pod 228 in FIG. 2 or pod 1 310 in FIG. 3, which is running a containerized application that provides a microservice using a set of containers. In this example, pod performance metrics 404 include pod warmup time, pod hibernation cost, probability of sudden increase in service requests for the microservice, and defined target objectives (e.g., performance service level agreements (SLAs) and service level objectives (SLOs) for the microservice.

Based on the analysis of pod performance metrics 404, pod optimizer 402 determines, for example: 1) when to preserve the optimal state of the pod to the pod-warm component (i.e., trigger generation of a snapshot image of the pod, such as, for example, pod snapshot image 318 in FIG. 3); 2) optimal performance thresholds (e.g., amount of resource utilization, number of service requests to accept per hour, maximum response time latency, and the like); and 3) a cost-based recommendation on how much to relax performance while making the first 2 recommendations above and remaining within the defined target objectives. Based on the determinations made by pod optimizer 402, pod optimizer 402 outputs recommended actions 408 for optimal pod management.

Figure 5:
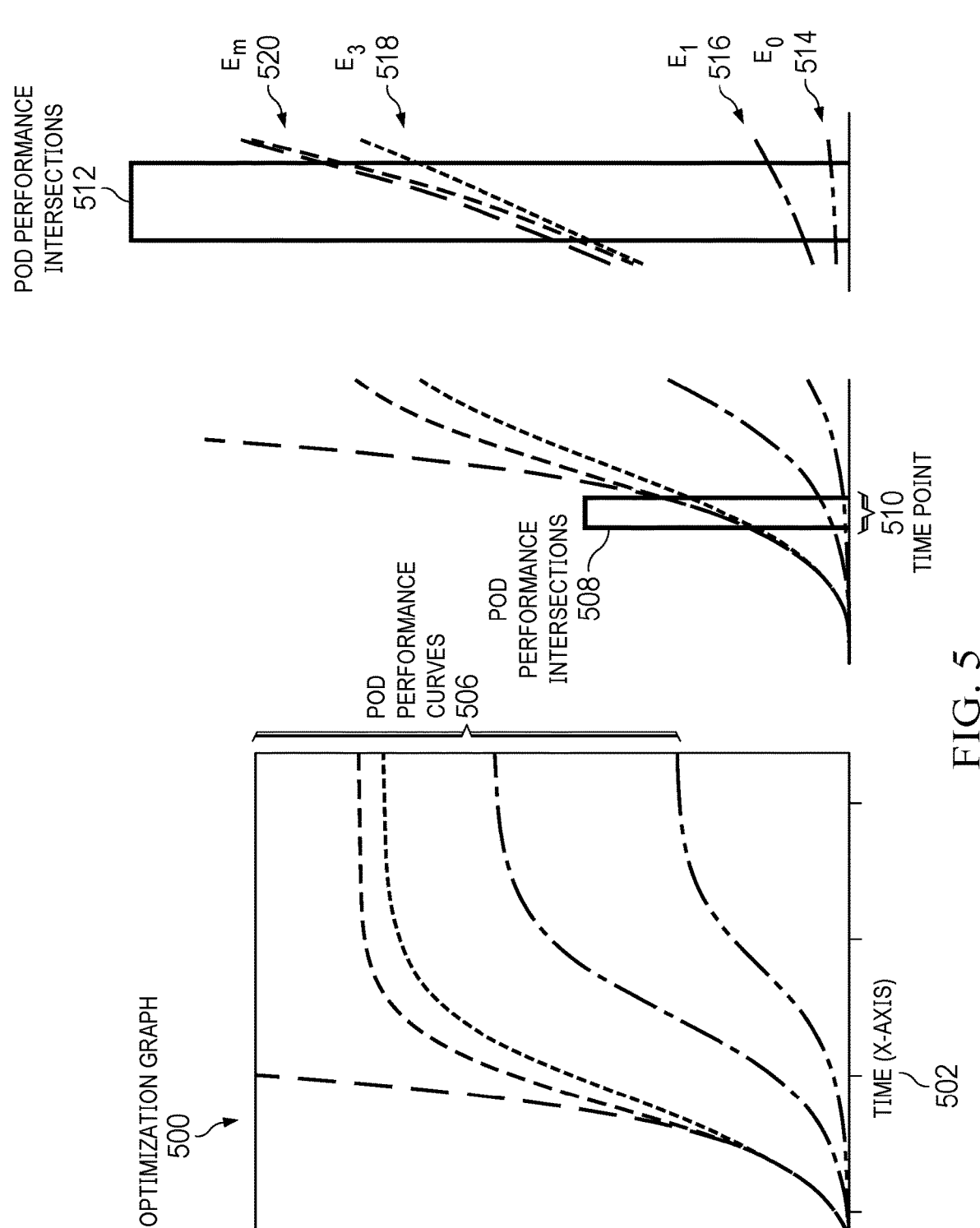
FIG. 5 is a diagram illustrating an example of a pod optimization graph in accordance with an illustrative embodiment.

With reference now to FIG. 5, a diagram illustrating an example of a pod optimization graph is depicted in accordance with an illustrative embodiment. Pod optimization graph 500 can be implemented in a pod optimizer, such as, for example, pod optimizer 220 in FIG. 2, pod optimizer 304 in FIG. 3, or pod optimizer 402 in FIG. 4, which is located in a controller node, such as, for example, controller node 204 in FIG. 2.

Pod optimization graph 500 includes x-axis time 502 and y-axis activation 504. The pod optimizer generates pod performance curves 506 corresponding to a pod, such as, for example, pod 228 in FIG. 2 or pod 1 310 in FIG. 3, based on analyzing pod performance metrics, such as, for example, pod performance metrics 404 in FIG. 4, received from a pod-warm component located in a host node, such as, for example, pod-warm 224 located in host node 206 in FIG. 2 or pod-warm 302 in FIG. 3. In addition, the pod optimizer identifies sets of performance intersections at different time points, such as pod performance intersections 508 at time point 510, along x-axis time 502 of pod optimization graph 500.

Pod performance intersections 512 is a magnified projection of pod performance intersections 508. In other words, pod performance intersections 512 is the same as pod performance intersections 508. Pod performance intersections 512 shows pod performance intersection $E_0$ 514, pod performance intersection $E_1$ 516, pod performance intersection $E_2$ 518, and pod performance intersection $E_m$ 520. However, it should be noted that pod performance intersections 512 is intended as an example only and not as a limitation on illustrative embodiments. For example, pod performance intersections 512 can include more or fewer pod performance intersections than shown.

With reference now to FIG. 6, a flowchart illustrating a process for instantiating a pod fully warm in an optimal state on a host node is shown in accordance with an illustrative embodiment. The process shown in FIG. 6 may be implemented in a computer, such as, for example, computer 101 in FIG. 1 or controller node 204 in FIG. 2. For example, the process shown in FIG. 6 may be implemented in pod optimization code 200 in FIG. 1.

The process begins when the computer, using a pod optimizer, receives a plurality of pod performance metrics corresponding to a pod running on a host node associated with the computer from a pod-warm component located on the host node (step 602). The computer, using the pod optimizer, determines that the pod has attained an optimal state based on the pod optimizer analyzing the plurality of pod performance metrics corresponding to the pod received from the pod-warm component located on the host node (step 604). The computer, using the pod optimizer, directs the pod-warm component located on the host node to trigger generation of a pod snapshot image of the pod in the optimal state in response to determining that the pod has attained the optimal state (step 606).

Subsequently, the computer receives an input to instantiate a second instance of the pod on the host node in response to the pod optimizer detecting that one or more of the plurality of pod performance metrics have exceeded a corresponding maximum pod performance metric threshold level (step 608). The computer, using the pod optimizer, directs the pod-warm component located on the host node to instantiate the second instance of the pod fully warm in the optimal state on the host node using the pod snapshot image of the pod to decrease startup time of the pod and increase performance of the host node (step 610). Thereafter, the process terminates.

With reference now to FIGS. 7A-7B, a flowchart illustrating a process for determining an optimal state of a pod is shown in accordance with an illustrative embodiment. The process shown in FIGS. 7A-7B may be implemented in a computer, such as, for example, computer 101 in FIG. 1 or controller node 204 in FIG. 2. For example, the process shown in FIGS. 7A-7B may be implemented in pod optimization code 200 in FIG. 1.

The process begins when the computer, using a pod optimizer, receives a plurality of pod performance metrics corresponding to operation of a microservice provided by a containerized application running in a pod of a host node from a pod-warm component located on the host node (step 702). The computer, using the pod optimizer, performs an analysis of the pod performance metrics corresponding to the operation of the microservice provided by the containerized application running in the pod of the host node received from the pod-warm component (step 704).

The computer, using the pod optimizer, generates a plurality of pod instantiation curves corresponding to the pod of the host node on a pod optimization graph based on the analysis of the pod performance metrics that correspond to the operation of the microservice provided by the containerized application running in the pod (step 706). The computer, using the pod optimizer, combines certain pod instantiation curves of the plurality of pod instantiation curves to form a set of prominent pod instantiation curves based on predicted service request load and defined target objectives corresponding to the pod (step 708).

The computer, using the pod optimizer, generates a plurality of performance curves corresponding to the pod based on the set of prominent pod instantiation curves (step 710). In addition, the computer, using the pod optimizer, generates a look ahead projection of time points on the pod optimization graph that intersect with each performance curve of the plurality of performance curves corresponding to the pod at different points in time (step 712). Each of the time points that intersects with each of the plurality of performance curves corresponding to the pod at the different points in time form a plurality of pod performance intersections corresponding to the plurality of performance curves on the pod optimization graph.

The computer, using the pod optimizer, selects a set of pod performance intersections from the plurality of pod performance intersections corresponding to the plurality of performance curves for the pod that corresponds to a shape approximate representing a global activation gradient for the pod (step 714). The computer, using the pod optimizer, determines an energy level of each pod performance intersection of the set of pod performance intersections corresponding to the plurality of performance curves for the pod that corresponds to the shape approximate representing the global activation gradient for the pod based on Kalman filtering (step 716).

The computer, using the pod optimizer, generates a look ahead curve that traces a path of maximum energy with minimum noise closest to all of the plurality of performance curves for the pod based on the energy level determined for each pod performance intersection of the set of pod performance intersections corresponding to the plurality of performance curves (step 718). Further, the computer, using the pod optimizer, performs recursive curve fitting of the look ahead curve over a time period to decrease curve fitment error to identify a best path of maximum energy with minimum noise closest to all of the plurality of performance curves for the pod (step 720).

The computer, using the pod optimizer, determines an optimal state of the pod based on the best path of maximum energy with minimum noise closest to all of the plurality of performance curves for the pod (step 722). The computer, using the pod optimizer, directs the pod-warm component located on the host node to take a snapshot image of the pod in the optimal state for future instantiations of the pod on the host node in response to the pod optimizer determining that the pod attained the optimal state (step 724). Thereafter, the process terminates.

Thus, illustrative embodiments of the present disclosure provide a computer-implemented method, computer system, and computer program product for optimal pod management meeting defined target objectives. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimal pod management, the computer-implemented method comprising:

generating, by a computer, a group of pod performance curves corresponding to a pod of a host node on a pod optimization graph based on analysis of pod performance metrics that correspond to the pod, wherein the pod optimization graph shows a relationship between time and pod activation;

selecting, by the computer, certain pod performance curves of the group of pod performance curves to form a set of pod performance curves based on predicted service request load and defined target objectives corresponding to the pod;

generating, by the computer, a plurality of performance curves corresponding to the pod based on the set of pod performance curves;

determining, by the computer, an optimal state of the pod that meets the defined target objectives corresponding to the pod based on a path of maximum energy with minimum noise closest to all of the plurality of performance curves for the pod;

directing, by the computer, a pod-warm component located on the host node to trigger generation of a pod snapshot image of the pod in the optimal state running on the host node for instantiation of the pod on the host node in response to determining that the pod attained the optimal state;

receiving, by the computer, an input to instantiate a second instance of the pod on the host node in response to detecting that one or more of a plurality of pod performance metrics have exceeded a corresponding maximum pod performance metric threshold level; and directing, by the computer, the pod-warm component located on the host node to instantiate the second instance of the pod fully warm in the optimal state on the host node using the pod snapshot image of the pod to decrease startup time of the pod and increase performance of the host node.

2. The computer-implemented method of claim 1, further comprising:

receiving, by the computer, the plurality of pod performance metrics corresponding to the pod running on the host node from the pod-warm component located on the host node; and determining, by the computer, that the pod has attained the optimal state based on analyzing the plurality of pod performance metrics corresponding to the pod received from the pod-warm component located on the host node.

3. The computer-implemented method of claim 1, further comprising:

performing, by the computer, the analysis of the pod performance metrics corresponding to operation of a microservice provided by a containerized application running in the pod of the host node received from the pod-warm component.

4. The computer-implemented method of claim 1, further comprising:

generating, by the computer, a look ahead projection of time points on the pod optimization graph that intersect with each performance curve of the plurality of performance curves corresponding to the pod at different points in time, each of the time points that intersects with each of the plurality of performance curves corresponding to the pod at the different points in time form a plurality of pod performance intersections corresponding to the plurality of performance curves on the pod optimization graph.

5. The computer-implemented method of claim 4, further comprising:

selecting, by the computer, a set of pod performance intersections from the plurality of pod performance intersections corresponding to the plurality of performance curves for the pod that corresponds to a shape approximate representing a global activation gradient for the pod; and determining, by the computer, an energy level of each pod performance intersection of the set of pod performance intersections corresponding to the plurality of performance curves for the pod that corresponds to the shape approximate representing the global activation gradient for the pod based on Kalman filtering.

6. The computer-implemented method of claim 5, further comprising:

generating, by the computer, a look ahead curve that traces the path of maximum energy with minimum noise closest to all of the plurality of performance curves for the pod based on the energy level determined for each pod performance intersection of the set of pod performance intersections corresponding to the plurality of performance curves; and performing, by the computer, recursive curve fitting of the look ahead curve over a time period to decrease curve fitment error to identify the path of maximum energy with minimum noise closest to all of the plurality of performance curves for the pod.

7. A computer system for optimal pod management, the computer system comprising:

a communication fabric;

a storage device connected to the communication fabric, wherein the storage device stores program instructions; and a processor connected to the communication fabric, wherein the processor executes the program instructions to:

generate a group of pod performance curves corresponding to a pod of a host node on a pod optimization graph based on analysis of pod performance metrics that correspond to the pod, wherein the pod optimization graph shows a relationship between time and pod activation;

select certain pod performance curves of the group of pod performance curves to form a set of pod performance curves based on predicted service request load and defined target objectives corresponding to the pod;

generate a plurality of performance curves corresponding to the pod based on the set of pod performance curves;

determine an optimal state of the pod that meets the defined target objectives corresponding to the pod based on a path of maximum energy with minimum noise closest to all of the plurality of performance curves for the pod;

direct a pod-warm component located on the host node to trigger generation of a pod snapshot image of the pod in the optimal state running on the host node for instantiation of the pod on the host node in response to determining that the pod attained the optimal state;

receive an input to instantiate a second instance of the pod on the host node in response to detecting that one or more of a plurality of pod performance metrics have exceeded a corresponding maximum pod performance metric threshold level; and direct the pod-warm component located on the host node to instantiate the second instance of the pod fully warm in the optimal state on the host node using the pod snapshot image of the pod to decrease startup time of the pod and increase performance of the host node.

8. The computer system of claim 7, wherein the processor further executes the program instructions to:

receive the plurality of pod performance metrics corresponding to the pod running on the host node from the pod-warm component located on the host node; and determine that the pod has attained the optimal state based on analyzing the plurality of pod performance metrics corresponding to the pod received from the pod-warm component located on the host node.

9. The computer system of claim 7, wherein the processor further executes the program instructions to:

perform the analysis of the pod performance metrics corresponding to operation of a microservice provided by a containerized application running in the pod of the host node received from the pod-warm component.

10. The computer system of claim 7, wherein the processor further executes the program instructions to:

generate a look ahead projection of time points on the pod optimization graph that intersect with each performance curve of the plurality of performance curves corresponding to the pod at different points in time, each of the time points that intersects with each of the plurality of performance curves corresponding to the pod at the different points in time form a plurality of pod performance intersections corresponding to the plurality of performance curves on the pod optimization graph.

11. A computer program product for optimal pod management, the computer program product comprising a computer-readable storage medium having program instructions embodied therewith, the program instructions executable by a computer to cause the computer to:

generate a group of pod performance curves corresponding to a pod of a host node on a pod optimization graph based on analysis of pod performance metrics that correspond to the pod, wherein the pod optimization graph shows a relationship between time and pod activation;

select certain pod performance curves of the group of pod performance curves to form a set of pod performance curves based on predicted service request load and defined target objectives corresponding to the pod;

generate a plurality of performance curves corresponding to the pod based on the set of pod performance curves;

determine an optimal state of the pod that meets the defined target objectives corresponding to the pod based on a path of maximum energy with minimum noise closest to all of the plurality of performance curves for the pod;

direct a pod-warm component located on the host node to trigger generation of a pod snapshot image of the pod in the optimal state running on the host node for instantiation of the pod on the host node in response to determining that the pod attained the optimal state;

receive an input to instantiate a second instance of the pod on the host node in response to detecting that one or more of a plurality of pod performance metrics have exceeded a corresponding maximum pod performance metric threshold level; and direct the pod-warm component located on the host node to instantiate the second instance of the pod fully warm in the optimal state on the host node using the pod snapshot image of the pod to decrease startup time of the pod and increase performance of the host node.

12. The computer program product of claim 11, wherein the program instructions further cause the computer to:

receive the plurality of pod performance metrics corresponding to the pod running on the host node from the pod-warm component located on the host node; and determine that the pod has attained the optimal state based on analyzing the plurality of pod performance metrics corresponding to the pod received from the pod-warm component located on the host node.

13. The computer program product of claim 11, wherein the program instructions further cause the computer to:

perform the analysis of the pod performance metrics corresponding to operation of a microservice provided by a containerized application running in the pod of the host node received from the pod-warm component.

14. The computer program product of claim 11, wherein the program instructions further cause the computer to:

generate a look ahead projection of time points on the pod optimization graph that intersect with each performance curve of the plurality of performance curves corresponding to the pod at different points in time, each of the time points that intersects with each of the plurality of performance curves corresponding to the pod at the different points in time form a plurality of pod performance intersections corresponding to the plurality of performance curves on the pod optimization graph.

15. The computer program product of claim 14, wherein the program instructions further cause the computer to:

select a set of pod performance intersections from the plurality of pod performance intersections corresponding to the plurality of performance curves for the pod that corresponds to a shape approximate representing a global activation gradient for the pod; and determine an energy level of each pod performance intersection of the set of pod performance intersections corresponding to the plurality of performance curves for the pod that corresponds to the shape approximate representing the global activation gradient for the pod based on Kalman filtering.

16. The computer program product of claim 15, wherein the program instructions further cause the computer to:

generate a look ahead curve that traces the path of maximum energy with minimum noise closest to all of the plurality of performance curves for the pod based on the energy level determined for each pod performance intersection of the set of pod performance intersections corresponding to the plurality of performance curves; and perform recursive curve fitting of the look ahead curve over a time period to decrease curve fitment error to identify the path of maximum energy with minimum noise closest to all of the plurality of performance curves for the pod.

*    *    *    *    *